United States Patent [19]
Willinger et al.

[11] 3,746,168
[45] July 17, 1973

[54] AQUARIUM FILTRATION INDICATOR
[75] Inventors: Allan H. Willinger, Clifton, N.J.;
Albert J. Dinnerstein, Far Rockaway, N.Y.; Avihu Kagan, Union, N.J.
[73] Assignee: Metaframe Corporation, Maywood, N.J.
[22] Filed: Nov. 23, 1971
[21] Appl. No.: 201,502

[52] U.S. Cl. .................................. 210/87, 210/169
[51] Int. Cl. ......................... B01d 35/14, E04h 3/20
[58] Field of Search ..................... 210/169, 90–98, 210/103, 117, 110, 104, 105, 87; 116/117 R

[56] References Cited
UNITED STATES PATENTS
| | | | |
|---|---|---|---|
| 1,933,409 | 10/1933 | Berman | 210/94 |
| 3,477,580 | 11/1969 | Willinger | 210/169 |
| 3,487,809 | 1/1970 | Scaborne | 116/117 |
| 1,449,217 | 3/1923 | Davis | 116/117 |
| 3,276,586 | 10/1966 | Rosaen | 210/91 |

FOREIGN PATENTS OR APPLICATIONS
| | | | |
|---|---|---|---|
| 839,592 | 6/1960 | Great Britain | 116/117 |

Primary Examiner—Samih N. Zaharna
Assistant Examiner—T. A. Granger
Attorney—Abraham Friedman and Abraham Goodman

[57] ABSTRACT

An aquarium filtering device comprising a housing in which is provided a partition for separating the housing into first and second chambers in communicating relation. The housing is provided with at least one opening through which water may enter into the first chamber from an external water-carrying source. The second chamber includes a filtering assembly for cleansing water which has entered the first chamber and which, thereafter, flows into the second chamber. An air conduit is provided for directing air into the second chamber for drawing water through the filtering assembly. Likewise, a conduit is provided for directing both air and cleansed water out of the second chamber after the water has been cleansed by the filtering assembly. A rotary indicator is provided for signalling visually the rate of inflow of water into the first chamber and outflow from the latter into the second chamber so as to guide adjustment and cleansing of the filtering device.

12 Claims, 4 Drawing Figures

Patented July 17, 1973 3,746,168

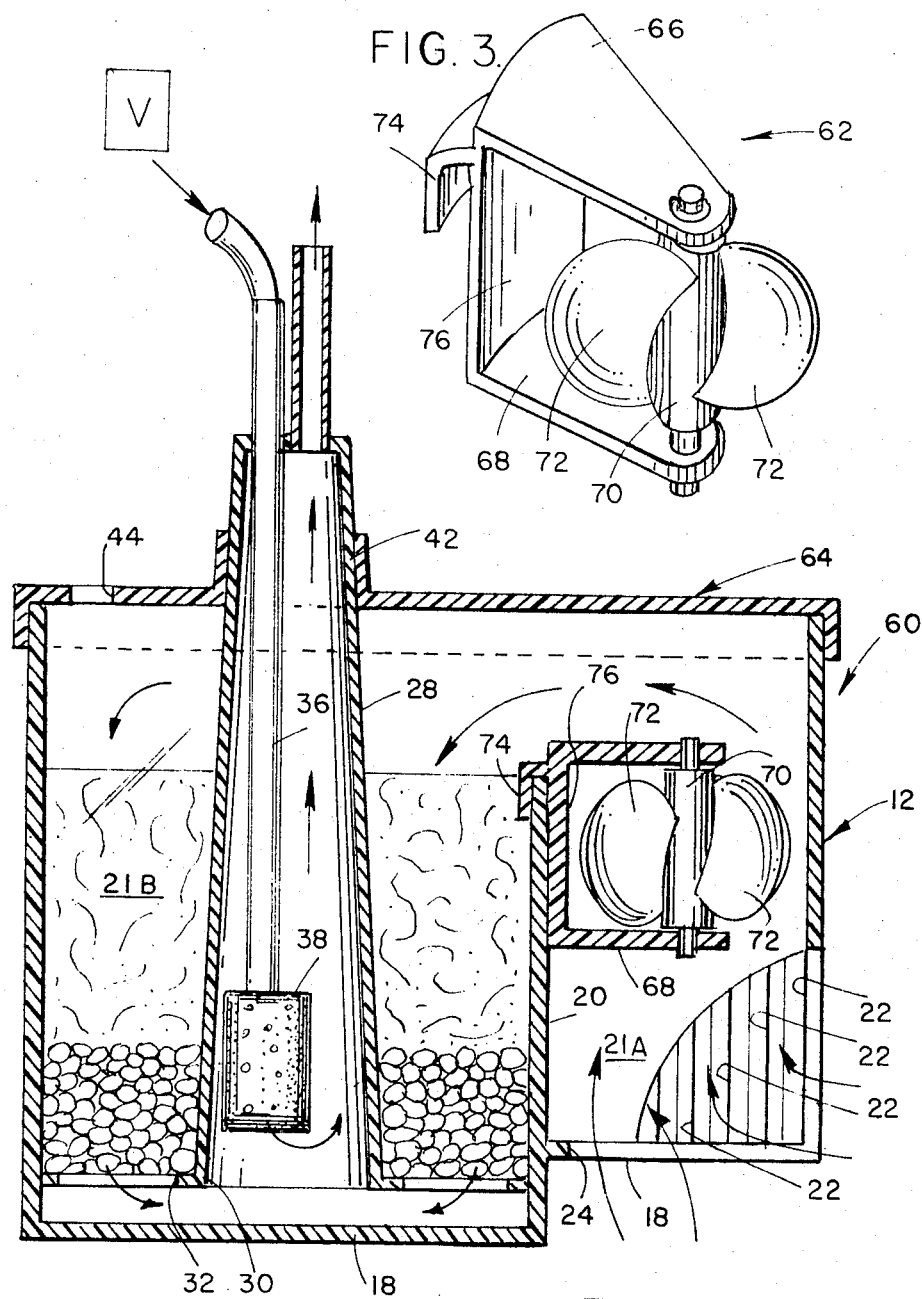

AQUARIUM FILTRATION INDICATOR

BACKGROUND OF THE INVENTION

The present invention relates generally to an air operated aquarium filter, and more particularly to a submerged aquarium filter that is provided with an indicator to signal the amount of water flow through the filtering medium so that the user may adjust the air flow so as to maximize water flow. The indicator also signals the clogging of the filter medium.

Filters that may be utilized in fish tanks and aquariums or the like generally are provided with a housing in which is contained a filtering assembly and is arranged so that water may pass through the filtering assembly to be cleansed by the latter. Generally, the water flows into the housing through suitably located openings in the latter and air is pumped into the housing from an external source, such as a pump or the like, to urge or draw the water in a preferred direction through the filtering assembly, thereafter, the water, together with the air injected into the filtering housing, may pass out of the housing to return into the fish tank or aquarium. The more rapidly water moves through the filter, the more rapidly debris will be removed from the aquarium. The amount of water flowing through the filter varies as a function of the amount of air flow; namely, water flow increases with increasing air flow up to some optimum level of air flow, but if air flow is increased above this optimum level, the resulting turbulence of air mixed with water will decrease the amount of water flow through the filter. The optimum air flow depends both on the shape of the filter housing and on the porosity of the filtering material. Existing air operated, submerged, aquarium filters do not provide the user with means to select an optimum level of air flow. The user commonly provides more or less air than that required for maximum filter effectiveness.

Moreover, as those skilled in the art readily appreciate, the filtering assembly or glass wool will become clogged after extended use as it removes debris and the like from water that passes through the housing and, thus, although the air bubbles leaving the housing may indicate that the air pump is operating, these air bubbles may not necessarily indicate that water is in fact passing through the clogged filtering assembly. For this reason, the housings of such filters are typically comprised of a transparent material so that the filtering is exposed to view. The filtering material is, furthermore, typically comprised, in part, of some light colored material such as glass or plastic wool or open-cell plastic foam, or the like. The darkening of this material, as it becomes laden with debris, serves as a crude indicator that the filtering material is becoming clogged. However, as those skilled in the art readily understand, the darkening of the filter material is an unreliable indicator of filter clogging, since the debris laden, but yet unclogged, filtering material is a more effective water purification material than is a completely clean filtering material, in that the debris laden filter material supports a variety of micro-organism, some of which trap fine particles, such as bacteria, from the water and others of which convert noxious organic compounds dissolved in the water into harmless nitrogen and carbon dioxide gas. By relying on the visual appearance of the filtering medium, the user will commonly replace the filtering material too soon or not soon enough for maximum filter effectiveness.

The typical transparency of the filter housing, previously required to permit a convenient, if unreliable, indicator of filter functioning, imposes aesthetic problems in an aquarium. The transparent housing is monotonous at best, and even a small quantity of debris in the filtering material makes the entire assembly most unsightly. When previously designed filter housings are occasionally comprised of opaque material, however, the user must generally dismantle the housing to discover whether or not the filtering medium is clogged. This is a cumbersome situation, both from the standpoint of time and convenience.

Furthermore, there is an aesthetic value in visible movement of solid objects. This is evidenced by the popularity of air activated "action ornaments" in aquariums, ornaments in which parts are caused to move by a stream of air bubbles which strike displaceable parts of the ornament structure. Such ornaments serve no functional purpose in an aquarium beyond adding a small amount of air to the aquarium water. If an "action ornament" provided useful information to the aquarium owner, the value of such "action ornaments"would be increased. Such is one function of the present invention.

SUMMARY OF THE INVENTION

Accordingly, it is an object of the present invention to provide a filtering device that may be utilized in an aquarium or the like.

It is another object of the present invention to provide an aquarium filtering device that includes means for indicating the operability of the filter.

It is still another object of the present invention to provide an air-operated filtering device including means for indicating when an optimum amount of air is being injected into the filter.

It is still another object of the present invention to provide an aquarium filter having means for visually signalling the passage of contaminated water through the filtering portions thereof.

It is still another object of the present invention to provide an aquarium in which the chamber containing the filtering material may be comprised of an opaque material while providing the user with information concerning the clogged or unclogged nature of the filtering medium.

It is still another object of the present invention to provide an aquarium filter that includes a decorative moving body extending externally of the filter, which body is driven by an impeller-carrying shaft, the latter which extends in the filter and is caused to rotate during inflow of water in and out of the filter.

To this end, the present invention relates to a filtering device comprising a housing in which is provided a partition for separating the housing into first and second chambers in communicating relation. The housing is provided with at least one opening through which water may enter into the first chamber from an external water-carrying source. The second chamber includes a filtering assembly for cleansing water which has entered the first chamber and which, thereafter, flows into the second chamber. An air conduit is provided for directing air into the second chamber for urging and drawing water through the filtering assembly. Likewise, a conduit is provided for directing both air and cleansed water out of the second chamber after the water has been cleansed by the filtering assembly. A rotary indicator is provided for signalling visually inflow of water into the first chamber and outflow from the latter into the second chamber.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 3 illustrates a perspective view of an alternate embodiment of the indicator; and FIG. 4 illustrates a view similar to that of FIG. 2, but showing the relationship of the embodiment in FIG. 3 with a conventional filter.

DETAILED DESCRIPTION OF THE INVENTION

Figure 1:
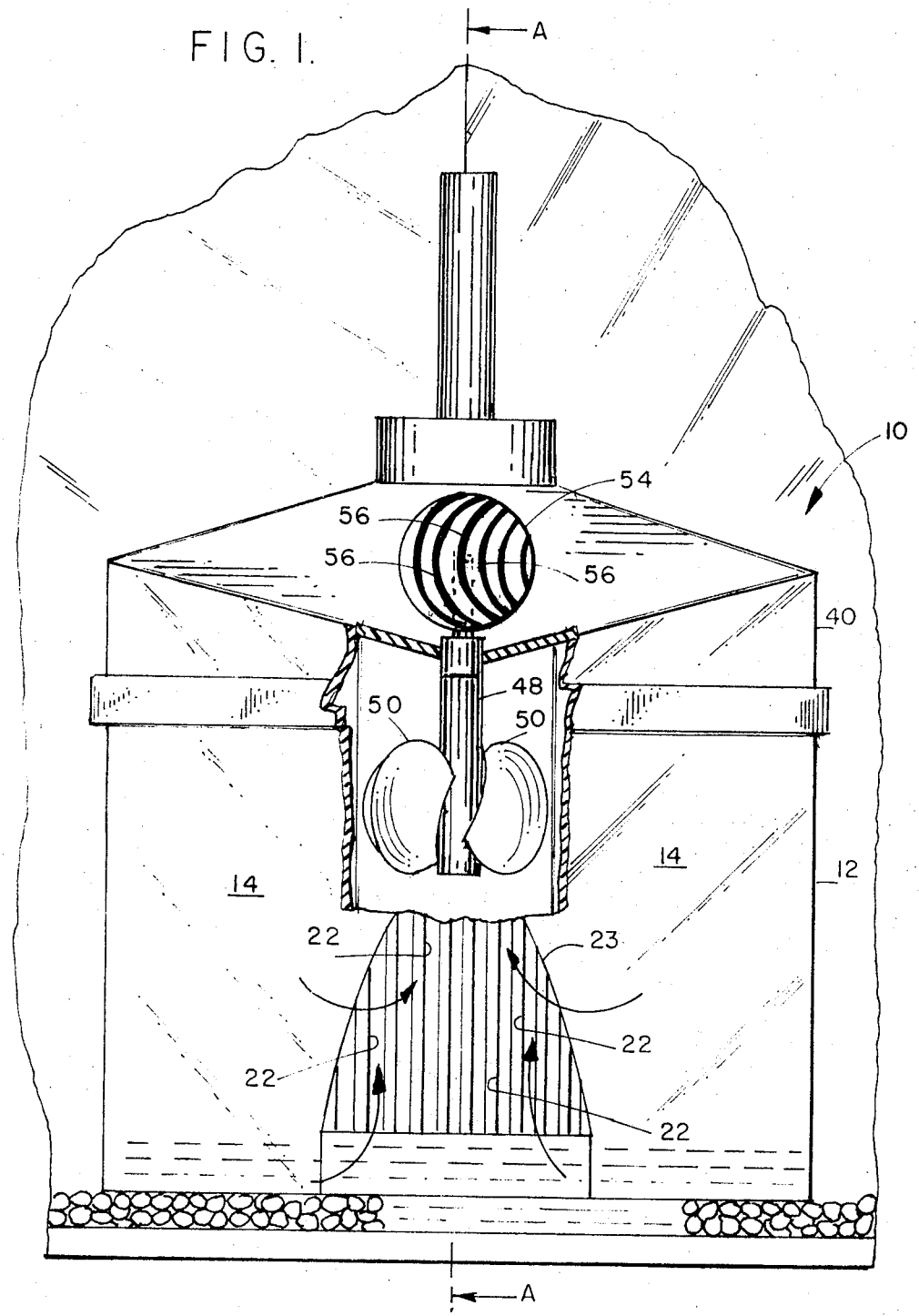
FIG. 1 is a front elevational view, fragmented partially in cross-section, illustrating the filtering device and indicator pursuant to the present invention as disposed at the bottom of an aquarium.
Figure 2:
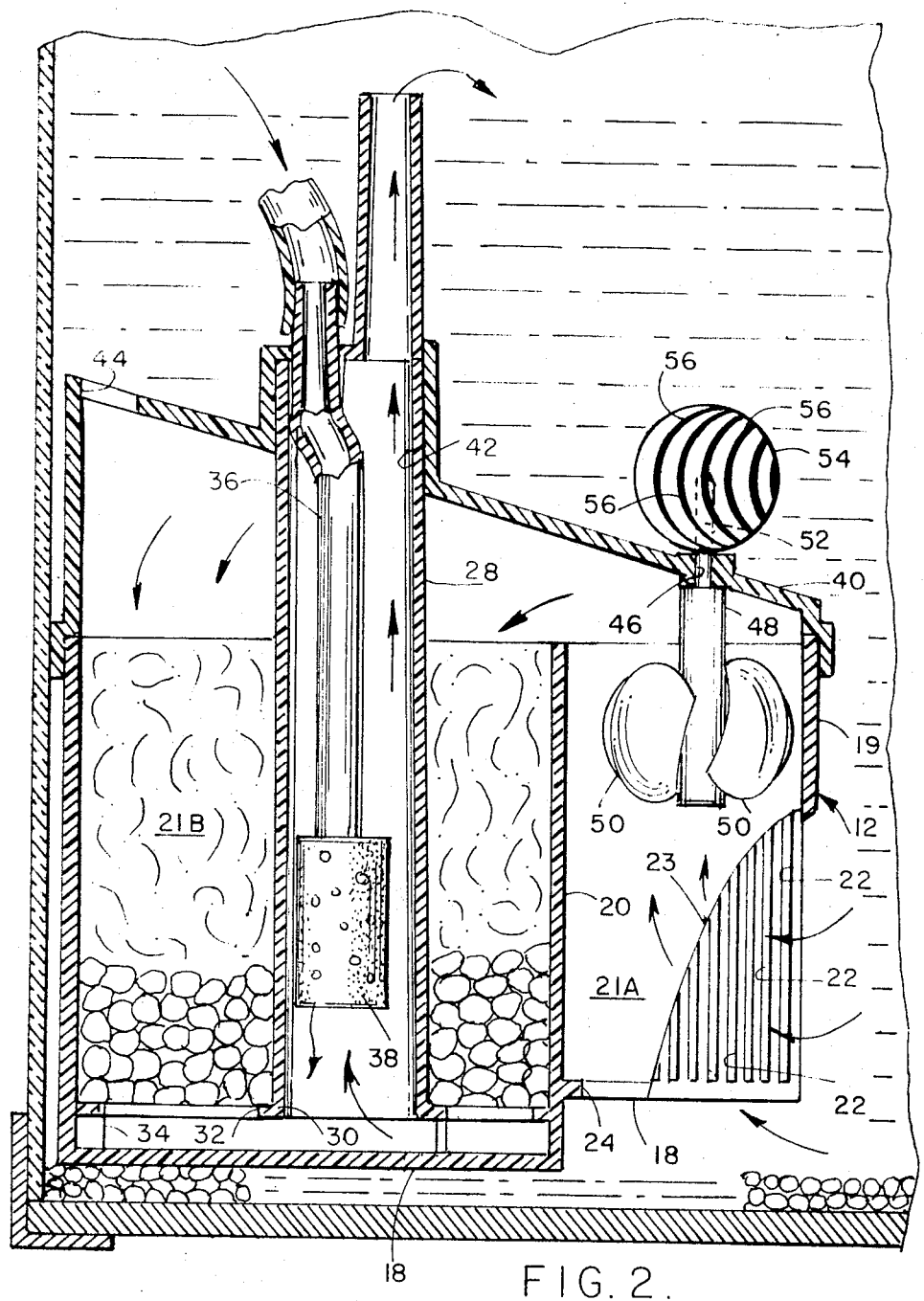
FIG. 2 illustrates a cross-sectional view taken along the line A—A in FIG. 1 of the operative association of the aquarium filter and indicator therefor, pursuant to the present invention, in an aquarium.

Referring now to the drawings and more particularly to FIGS. 1 and 2 thereof, the present invention comprises an aquarium filter generally denoted by the reference character 10. The filter 10 includes a housing 12 defined by a pair of front sidewalls 14 and a pair of rear sidewalls (not shown) all integrally interconnected to one another, in a generally square-like array, and to a bottom portion 18. The front side walls 14 are separated from one another through the intermediary of a rounded vertical corner 19, whereas the rear sidewalls 16 are interconnected to one another in mutually perpendicular relation (not shown). Furthermore, as illustrated in FIG. 2, the housing 12 is provided with a partition 20 which is rounded in horizontal cross-section (now shown) and acts to define two chambers 21A and 21B, respectively. Chamber 21A is defined by the front sidewalls 14 and the concavity of partition 20, whereas the chamber 21B is defined by the rear sidewalls 16, together with the convexity of partition 20.

As illustrated most clearly in FIG. 2, the front sidewalls 14, or in effect, the rounded corner portion 19 separating the front sidewalls 14, is provided with a plurality of vertically extending slots 22 having a somewhat parabolic vorder 23. Similarly, the bottom portion 18 of the housing 12 is provided with a plurality of spaced slots 24. The slots 22 and 24 extend generally relative to one another in mutually perpendicular relation.

Continuing, with reference to FIG. 2, the aquarium filter 10, pursuant to the present invention, further comprises an elongate annular conduit 28 which is generally tapered in cross-section and has a pair of opposite open ends. A platform 30, having a plurality of slotted openings 32 therein, is fixedly connected to the elongate annular conduit 28 at the lower open end thereof and extends generally transversely thereto. The platform 30 rests on a number of spacing lugs 34 (only one shown) which are provided at the bottom portion 18 of the housing 12. The platform 30 may be fit into the housing 12 until the platform 30 contacts the spacing lugs 34, the latter which act to provide a clearance or define a third chamber between the platform 30 and the bottom portion 18 of the housing 12, which third chamber communicates with the conduit 28 and the second chamber 21B through the intermediary of the slotted openings 32 provided in the platform 30. The platform 30, internally of the chamber 21B, acts to support a filtering assembly such as glass wool, charcoal and the like and, thus, the second chamber 21B may be characterized as a filtering or cleansing chamber through which contaminated water may pass to be decontaminated thereby.

An air inlet conduit 36 is provided for directing air into the elongate annular conduit 28 and is connected at one end thereof to a pump (not shown in the drawings) and at the other end to an air permeable element 38 which acts to disperse incoming air throughout the elongate annular conduit 28. The function of the air inlet conduit 36 and air-permeable element 38 will be further clarified below.

The housing 12 is provided with a cover member 40 which may be press-fit onto the front and rear sidewalls embrace the latter. The cover member 40 is, furthermore, provided with a raised opening 42 which surrounds the uppermost portion of the elongate annular conduit 28 so that air and cleansed or decontaminated water may be expelled from the aquarium filter 10. The cover member 40 is also provided with an air-vent or opening 44 at one corner thereof so that, when the aquarium filter 10 is initially disposed into the aquarium, water may readily enter into the filter 10 through the slotted openings 22 and 24 respectively and air existing in the aquarium filter 10 may be readily expelled through the air vent 44 and, thus, will not present any obstacle to the inflow of water through the slotted openings 22 and 24 respectively.

The aquarium filter 10, as indicated above, is, provided with indicating means for signalling its operability. The indicating means acts to provide a visual signal to an observer that water is flowing into the chamber 21A through the intermediary of the slotted openings 22 and 24 respectively. In this respect, the cover member 40 is provided with another opening 46 in which is rotatably journaled freely, a rotary shaft 48 carrying preferably helical impellers or fins 50 and extending internally of the chamber 21A. Extending through the opening 46, externally of the filter 10, is the upper shaft portion 52 of the shaft 48 upon which is fixedly mounted a decorative spherical body 54, or the like, upon which is provided striped markings 56, or the like, the purpose of which will be clarified below.

In operation, the aquarium filter 10 is disposed internally of an aquarium so that water in an aquarium may readily enter into the housing 12 while excess air initially in the housing 12 is expelled through the air vent 44. Water may also readily flow into the chamber 21A through the slotted openings 22 and 24 respectively, without obstacles thereto. The inflow of water into the chamber 21A, as indicated by the arrows in FIG. 2, will act upon the impellers 50 and due to the helical nature of the latter, the upflow of water from chamber 21A and downflow from the latter into chamber 21B will cause the rotary shaft 48 to rotate. Clearly, the spherical body 54, which is fixedly mounted upon the rotary shaft 48, will likewise rotate together with the latter. Moreover, because of the striped markings 56, provided on the spherical body 54, the rotation of the spherical body is more visually emphasized to an observer, such as the hobbyist who will, thereby, be signalled when the filtering device 10 is in fact operating. The striped spherical body could be replaced, as is obvious to anyone skilled in the art, by almost any other shape such as a fish, submarine or human figure as examples, and may, therefore, be characterized as an "action ornament."

As those skilled in the art readily understand, the air tubing supplying air to the air conduit 36 is, typically, in series with an adjustable air valve V in FIG. 4, which can be employed to increase or decrease the amount of air entering the elongated annular conduit 28. By observing the decorative spherical body 54, while increasing and decreasing the amount of air, the user may optimize air flow by selecting that air flow which maximizes the rate of rotation of the spherical body 54.

Furthermore, as those skilled in the art readily understand, the filtering material or glass wool and charcoal which are contained internally of the chamber 21B become clogged after a period of time and, thus, upon becoming clogged, the latter obstructs the flow of water and must be replaced to maintain the aquarium in which the aquarium filter 10 is disposed in a cleansed condition. Thus, notwithstanding the fact that the pump is operating as may be indicated by the air bubbles which ascend in the elongate annular conduit 28, the filtering device 10 may be clogged and, therefore, inoperable, which inoperability may not be necessarily easily or readily observable.

In this instance, as the filtering materials have become clogged, the operating condition of water passing through the filtering device 10 will decrease and finally terminate and clearly, the extend of water inflow into the chamber 21A will, thereby, likewise decrease and terminate. As those skilled in the art will readily understand, a termination of water inflow into chamber 21A prevents the filtering device 10 from further cleansing contaminated water and is, therefore, useless unless the filtering materials as clogged are replaced.

Obviously, as the rate of water inflow into chamber 21A decreases, the rate of rotation of the spherical body 54 will decrease. Once there is a sufficient decrease of water inflow into chamber 21A, the impellers 50 cannot respond and cause rotation of the spherical body 54. Thus, when the hobbyist notices that the spherical body 54 has significantly slowed, or is not in a condition of rotation, this will indicate that the filtering materials require replacement because of their clogged condition.

Therefore, the spherical body 54 acts as an indicator for signalling the operability and degree of operability of the filtering device 10, when the spherical body 54 is in a condition of rotation and relative or complete inoperability of the filtering device 10, or the clogged nature of the filtering materials, when the spherical body 54 slows its rate of rotation or is not in a condition of rotation.

In the normal course of operation, water will then, after being decontaminated in the chamber 21B, flow into the elongate annular conduit 28 through the openings 32 provided in the platform 30 and will be expelled from the conduit 28 at the uppermost open end of the latter. The inflow of water into the housing 12 will traverse the aforementioned path because of the injection of air into the elongate annular conduit 28 through the intermediary of the air inlet conduit 36 and the air-permeable member 38. Thus, the pressurized air which is injected into the annular conduit 28 causes the continuous inflow of water into the housing 12 to be cleansed by the latter and expelled therefrom together with the pressurized air through the upper opening in the annular conduit 28.

Pursuant to an alternate embodiment of the invention, to permit utilization of the principal of the present invention, with a conventional filtration device denoted by the reference character 60 in FIG. 4, there is provided an insert-type of indicator denoted by the reference character 62 in FIG. 3.

The device 60 is provided with a housing 12 of generally identical nature as that illustrated in FIGS. 1 and 2 and, thus, the same reference characters denote similar elements in both embodiments. Moreover, the device 60 is provided with a cover member 64 which is press-fitted onto the housing 12. Although the partition 10 is illustrated in cross-section as a vertical extent which divides the housing 12 into the chambers 21A and 21B, the partition 20, in horizontal cross-section (not shown), is preferably of arcuate extent, the purpose of which will be clarified below.

Referring now to FIG. 3 of the instant drawings, the insert-type indicator 62 is provided with forwardly extending upper and lower flanges 66 and 68 respectively, between which flanges is interposed in a freely journaled fashion, a rotary shaft 70. Fixedly mounted on the rotary shaft 70, for rotation therewith, are a pair of generally helically extending impellers 72. Moreover, the indicator 62 is provided with a shouldered down-turned rear flange 74 which extends from a vertical rear wall 76 in generally spaced relation with the latter.

The indicator 62 may be mounted upon or slipped onto the partition 20 of the housing 12 in a manner illustrated in FIG. 4, by removing the cover member 64 from the housing 12. Thus, because of the provision of the shouldered down-turned rear flange 74, the latter may overlie the uppermost edge portion of the partition 20 and, thereby, support the indicator 62 so as to extend in the chamber 21A. Moreover, the shouldered down-turned rear flange 74 and the vertical rear wall 76 are each of arcuate extent, in horizontal cross-section (not shown), for receiving therebetween the arcuate extent of the partition 20. This relationship of the mutual arcuate extents of the flange 74, vertical rear wall 76 and partition 20 resists pivotal displacement or pivotal uplift of the indicator 62 relative to the partition 20 at the extreme top-edge of the partition 20.

The arrangement of the apparatus illustrated in FIG. 4 results in an operation which is generally similar to the operation of the arrangement illustrated in FIGS. 1 and 2 and, therefore, the inflow of water into chamber 21A and the outflow of water from chamber 21A into chamber 21B causes the helical impellers 72 to rotate relative to the flanges 66 and 68 respectively, which rotation may be readily observed externally of the housing 12, since the housing 12 is commonly constituted of transparent material. Moreover, in order to enhance the extent of observation of the rotation of the impellers 72, the latter may be provided with opaque strips or other suitable markings (not shown) in a manner illustrated in FIG. 2 for the spherical body 54, for emphasizing the fact that the rotary shaft 70 is in a condition of rotation and that the filtration device is in a condition of operation, in a manner aforementioned for the embodiment illustrated in FIGS. 1 and 2.

Both embodiments of the invention illustrated in FIGS. 1, 2, 3 and 4, can conceal the unsightly, debris laden filter material from view without interfering with the utility of the filter. In the embodiment shown in FIGS. 1 and 2, the entire housing 12, and cover 40, can be comprised of an opaque material because the movement, or lack of movement, of the spherical body 56 informs the user of the condition of the filtering material. In the embodiment illustrated in FIGS. 3 and 4, all of the housing can be opaque except for the outer walls of chamber 21A, in which the impellers 72 are located.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention. What is claimed is:

1. An aquarium filtering device in combination with an aquarium tank having contaminated and decontaminated water therein, said filtering device comprising in combination a housing provided with three chambers defining a first inlet chamber in fluid flow relation with the aquarium tank and a second filtration chamber in fluid flow relation with said first inlet chamber and a third outlet chamber in fluid flow relation with said second filtration chamber, a mass of filtering material in said second filtration chamber, said third outlet chamber being provided with opening means for ingress of air into said third outlet chamber and egress of decontaminated water out of said third outlet chamber into the aquarium tank, said first inlet chamber being provided with inlet means comprising an inlet through which contaminated water from the tank may flow, an air stream supply means disposed in said third outlet chamber which directs ingressed air from said opening means into said third outlet chamber thereby when the filtering material is unclogged causing contaminated water from the aquarium tank to flow through said inlet into said first inlet chamber and therefrom into said second filtration chamber where the contaminated water is substantially decontaminated by the filtering material before flowing into said third outlet chamber and being egressed through said opening means into the aquarium tank, and indicating means associated with said first inlet chamber and responsive to flow of water from said inlet to said second filtration chamber for signalling flow of the contaminated water through the filtering material, said indicating means including a rotary shaft supported in said first inlet chamber, said shaft being provided with at least one helical impeller for indicating rate of flow of the water from said inlet to said second filtration chamber.

2. A filtering device as claimed in claim 1 including means for controlling the amount of air directed into said third outlet chamber and, thereby, controlling the rate of movement of said indicating means.

3. A filtering device as claimed in claim 1, wherein said shaft is rotatively connected to a cover portion of said housing.

4. A filtering device as claimed in claim 1 wherein a portion of said housing is constituted of opaque material for concealing said filtering means.

5. A filtering device as claimed in claim 1 wherein said indicating means includes a body disposed externally of said housing and operatively associated with said shaft for movement when said shaft undergoes rotation.

6. A filtering device as claimed in claim 1 wherein said indicating means includes a body disposed externally of said housing and fixedly supported on said shaft for rotation together with said shaft.

7. A filtering device as claimed in claim 6 wherein said body includes markings which undergo rotation therewith for emphasizing rotation of said body.

8. A filtering device as claimed in claim 1 including securing means disposed within said housing for detachably connecting said indicating means to said filtering device.

9. A filtering device as claimed in claim 8 wherein said securing means and said filtering device include interfitting members which are operatively associated with one another in detachable slip-on relation.

10. A filtering device as claimed in claim 9, wherein said securing means includes a down-turned flange portion for overlying and resting freely on an upper portion of a vertically extending partition member disposed in said housing, said partition member separating said first inlet chamber from said second filtration chamber.

11. A filtering device as claimed in claim 9 wherein said securing means includes a down-turned flange portion for overlying and resting freely on an associated interfitting member of said filtering device.

12. A filtering device as claimed in claim 11 wherein said interfitting members include arcuate extents respectively engageable with one another transversely of the down-turned extent of said flange portion.

* * * * *